(12) United States Patent
Sigler et al.

(10) Patent No.: US 11,065,710 B2
(45) Date of Patent: Jul. 20, 2021

(54) RESISTANCE SPOT WELDING WORKPIECE STACK-UPS HAVING A STEEL WORKPIECE AND AN ALUMINUM WORKPIECE WITH A STEEL PLATE

(71) Applicant: GM GLOBAL TECHNOLOGY OPERATIONS LLC, Detroit, MI (US)

(72) Inventors: David R. Sigler, Shelby Township, MI (US); Blair E. Carlson, Ann Arbor, MI (US); Charles E. Jensen, Shelby Township, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 568 days.

(21) Appl. No.: 15/920,784

(22) Filed: Mar. 14, 2018

(65) Prior Publication Data
US 2019/0283168 A1    Sep. 19, 2019

(51) Int. Cl.
*B23K 11/20* (2006.01)
*B23K 37/04* (2006.01)
*B23K 11/11* (2006.01)

(52) U.S. Cl.
CPC ............. *B23K 11/20* (2013.01); *B23K 11/115* (2013.01); *B23K 37/0408* (2013.01)

(58) Field of Classification Search
CPC .... B23K 11/20; B23K 11/115; B23K 37/0408
USPC ........ 219/86.1, 86.22, 86.31, 87, 91.1, 91.2, 219/91.22, 92, 117.1, 118, 119
See application file for complete search history.

(56) References Cited

U.S. PATENT DOCUMENTS

| | | |
|---|---|---|
| 5,302,797 A | 4/1994 | Yasuyama et al. |
| 5,304,769 A | 4/1994 | Ikegami et al. |
| 5,783,794 A | 7/1998 | Oikawa et al. |
| 6,037,559 A | 3/2000 | Okabe et al. |
| 7,850,059 B2 | 12/2010 | Kobayashi et al. |
| 7,935,908 B2 | 5/2011 | Nakagawa et al. |
| 7,951,465 B2 | 5/2011 | Urushihara et al. |
| 7,984,840 B2 | 7/2011 | Kobayashi et al. |
| 8,020,749 B2 | 9/2011 | Kobayashi et al. |
| 8,058,584 B2 | 11/2011 | Miyamoto et al. |

(Continued)

FOREIGN PATENT DOCUMENTS

| | | |
|---|---|---|
| CN | 1946506 | 4/2007 |
| CN | 102059439 | 5/2011 |

(Continued)

OTHER PUBLICATIONS

Wang et al., "Interface microstructure and weld strength of steel/aluminum alloy joints by resistance spot welding," Applied Mechanics and Materials, vols. 117-119 (2012) pp. 1895-1899.

(Continued)

*Primary Examiner* — Phuong T Nguyen (57) ABSTRACT

A method of resistance spot welding a workpiece stack-up. The workpiece stack-up includes at least a steel workpiece and an aluminum workpiece. The method involves attaching a steel plate to the steel workpiece at a weld-site of the workpiece stack-up, passing electrical current between a first welding electrode and a second welding electrode at the weld-site, and terminating passage of electrical current between the first and second welding electrodes in order to form a weld joint. The steel plate serves to stiffen the weld joint.

20 Claims, 5 Drawing Sheets

(56) References Cited

U.S. PATENT DOCUMENTS

| | | | |
|---|---|---|---|
| 8,487,206 B2 | 7/2013 | Urushihara et al. | |
| 8,502,105 B2 | 8/2013 | Tanaka et al. | |
| 9,676,065 B2 | 6/2017 | Sigler et al. | |
| 2005/0218121 A1 | 10/2005 | Hayashi et al. | |
| 2005/0247679 A1 | 11/2005 | Wang | |
| 2007/0212565 A1 | 9/2007 | Urushihara et al. | |
| 2009/0255908 A1 | 10/2009 | Sigler et al. | |
| 2011/0097594 A1* | 4/2011 | Tanaka | B23K 11/24 428/594 |
| 2012/0021240 A1 | 1/2012 | Urushihara et al. | |
| 2013/0189023 A1 | 7/2013 | Spinella | |
| 2013/0263638 A1 | 10/2013 | Gugel et al. | |
| 2014/0305912 A1 | 10/2014 | Taniguchi et al. | |
| 2014/0360986 A1 | 12/2014 | Sigler et al. | |
| 2015/0053654 A1 | 2/2015 | Sigler et al. | |
| 2015/0053655 A1 | 2/2015 | Sigler et al. | |
| 2015/0083693 A1 | 3/2015 | Schroth et al. | |
| 2015/0096961 A1 | 4/2015 | Carlson et al. | |
| 2015/0096962 A1* | 4/2015 | Sigler | B23K 35/0261 219/91.2 |
| 2015/0231729 A1 | 8/2015 | Yang et al. | |
| 2015/0231730 A1 | 8/2015 | Sigler et al. | |
| 2015/0352658 A1 | 12/2015 | Yang et al. | |
| 2015/0352659 A1 | 12/2015 | Sigler et al. | |
| 2016/0016252 A1 | 1/2016 | Edwards, II | |
| 2016/0158874 A1 | 6/2016 | Wang et al. | |
| 2016/0279732 A1 | 9/2016 | Sigler et al. | |
| 2016/0288242 A1 | 10/2016 | Sigler et al. | |
| 2016/0346865 A1 | 12/2016 | Sigler et al. | |
| 2017/0008118 A1 | 1/2017 | Yang et al. | |
| 2017/0106466 A1 | 4/2017 | Sigler et al. | |
| 2017/0157697 A1 | 6/2017 | Yang et al. | |
| 2017/0225262 A1 | 8/2017 | Sigler et al. | |
| 2017/0225263 A1 | 8/2017 | Sigler et al. | |
| 2017/0232548 A1 | 8/2017 | Carlson et al. | |
| 2017/0252853 A1 | 9/2017 | Wang et al. | |
| 2017/0282303 A1 | 10/2017 | Wang et al. | |
| 2017/0291246 A1 | 10/2017 | Sigler et al. | |
| 2017/0291247 A1 | 10/2017 | Sigler et al. | |
| 2017/0291248 A1 | 10/2017 | Sigler et al. | |
| 2017/0297134 A1 | 10/2017 | Sigler et al. | |
| 2017/0297135 A1 | 10/2017 | Sigler et al. | |
| 2017/0297136 A1 | 10/2017 | Brown et al. | |
| 2017/0297137 A1 | 10/2017 | Perry et al. | |
| 2017/0297138 A1 | 10/2017 | Sigler et al. | |
| 2017/0304925 A1 | 10/2017 | Sigler et al. | |
| 2017/0361392 A1 | 12/2017 | Sigler et al. | |

FOREIGN PATENT DOCUMENTS

| | | |
|---|---|---|
| CN | 102059439 A | 5/2011 |
| CN | 102114574 | 7/2011 |
| CN | 102794557 A | 11/2012 |
| CN | 105312754 A | 2/2016 |
| CN | 106853548 A | 6/2017 |
| JP | 067951 A | 1/1994 |
| JP | 07132380 A | 5/1995 |
| JP | 11342477 | 12/1999 |
| JP | 2007283313 A | 11/2007 |
| JP | 2011224578 | 11/2011 |
| JP | 2013151017 | 8/2013 |
| JP | 0663762 | 6/2017 |
| JP | 07328774 | 6/2017 |
| JP | 09155561 A | 6/2017 |

OTHER PUBLICATIONS

Zhang et al., "Effects of resistance spot welding parameters on microstructures and mechanical properties of dissimilar material joints of galvanised high strength steel and aluminum alloy," Science and Technology of Welding Journal, vol. 16 (2011) No. 2 pp. 153-161.

Weihua et al., "Microstructure and mechanical property of resistance spot welded joint of aluminum alloy to high strength steel with especial electrodes," China Welding, vol. 20 (2011) No. 2 pp. 1-6.

Weihua et al., "Interfacial characterization of resistance spot welded joint of steel and aluminum alloy," China Welding, vol. 19 (2010) No. 4 pp. 6-10.

Zhang et al., "Characterization of Intermetallic Compounds in Dissimilar Material Resistance Spot Welded Joint of High Strength Steel and Aluminum Alloy," ISIJ International, vol. 51 (2011) No. 11 pp. 1870-1877.

Choi et al., "A Hybrid Joining Technology for Aluminum/Zinc Coated Steels in Vehicles," J. Mater. Sci. Technol., 2010, 26(9), pp. 858-864.

Hwang et al., "Dissimilar Metal Welding of Steel to Al—Mg Alloy by Spot Resistance Welding," Advanced Materials Research, vols. 15-17 (2007) pp. 381-386.

Imaizumi et al., "Joining Aluminum Automotive Body Alloys to Mild Steel by Resistance Spot Welding," Journal of the Japan Light Metal Welding and Construction Association, vol. 17 (1979) No. 1 pp. 10-17.

Miyamoto et al., "Dissimilar Joining of Aluminum Alloy and Steel by Resistance Spot Welding," SAE Int. J. Mater. Manuf., vol. 2 (2009) Issue 1 pp. 58-67.

Mortazavi et al., "Investigation on Joint Strength of Dissimilar Resistance Spot welds of Aluminum Alloy and Low Carbon Steel," Advanced Materials Research, vols. 264-265 (2011) pp. 384-389.

Qiu et al., "Resistance Spot Welding between Aluminum Alloy and Low-Carbon Steel," Advanced Materials Research, vol. 189-193 (2011) pp. 3534-3540.

Qui et al., "Interfacial microstructure and strength of steel/aluminum alloy joints welded by resistance spot welding with cover plate," Journal of Materials Processing Technology, 209 (2009) pp. 4186-4193.

Ueda et al., "Effects of Zn-Based Alloys Coating on Mechanical Properties and Interfacial Microstructures of Steel/Aluminum Alloy Dissimilar Metals Joints Using Resistance Spot Welding," Materials Transactions, vol. 52 (2011) No. 5 pp. 967-973.

English translation of CN 102059439 to Mazda Motor (published May 18, 2011).

English translation JP 2011224578 to Kobe Steel (published Nov. 10, 2011).

English translation of JP2013151017 to Mazda Motor (published Aug. 8, 2013).

Haselhuhn et al., U.S. Appl. No. 15/807,219 entitled "Electrode Weld Face Design," filed Nov. 8, 2017.

Sigler et al., U.S. Appl. No. 15/907,996 entitled "Improving Mechanical Performance of Al-Steel Weld Joints by Limiting Steel Sheet Deformation," filed Feb. 28, 2018.

Sigler et al., U.S. Appl. No. 15/976,163 entitled "Multi-Step Direct Welding of an Aluminum-Based Workpiece to a Steel Workpiece," filed May 10, 2018.

Yang et al., U.S. Appl. No. 15/992,748 entitled "Electrode for Resistance Spot Welding of Dissimilar Metals," filed May 30, 2018.

CN, First Office Action, CN Application 2019101318264 dated Nov. 30, 2020.

* cited by examiner

RESISTANCE SPOT WELDING WORKPIECE STACK-UPS HAVING A STEEL WORKPIECE AND AN ALUMINUM WORKPIECE WITH A STEEL PLATE

INTRODUCTION

The technical field of this disclosure relates generally to resistance spot welding and, more particularly, to resistance spot welding a workpiece stack-up that includes a steel workpiece and an aluminum workpiece.

Resistance spot welding is a process used by a number of industries to join together two or more metal workpieces. The automotive industry, for example, uses resistance spot welding to join together metal workpieces during the manufacture of vehicle structural frame members (e.g., body sides and cross-members) and vehicle closure members (e.g., vehicle doors, hoods, trunk lids, and lift gates), among others. A number of spot welds are often formed at various points around a peripheral edge of the metal workpieces or some other bonding region to ensure the part is structurally sound. While spot welding has typically been practiced to join together certain similarly composed metal workpieces—such as steel-to-steel and aluminum-to-aluminum—the desire to incorporate lighter weight materials into a vehicle body structure has generated interest in joining steel workpieces to aluminum workpieces by resistance spot welding. This desire to resistance spot weld dissimilar metal workpieces is not unique to the automotive industry—indeed, it extends to other industries including the aviation, maritime, railway, and building construction industries, among others.

Resistance spot welding relies on the flow of electrical current through overlapping metal workpieces and across their faying interface(s) to generate the heat needed for welding. To carry out such a welding process, a set of opposed welding electrodes is pressed in facial alignment against opposite sides of the workpiece stack-up, which typically includes two or three metal workpieces arranged in a lapped configuration. Electrical current is then passed through the metal workpieces from one welding electrode to the other. Resistance to the flow of the electrical current generates heat within the metal workpieces and at their faying interface(s). When the workpiece stack-up includes an aluminum workpiece and an adjacent overlapping steel workpiece, the heat generated at the faying interface and within the bulk material of those dissimilar metal workpieces initiates and grows a molten aluminum weld pool within the aluminum workpiece. The molten aluminum weld pool wets the adjacent faying surface of the steel workpiece and, upon termination of the current flow, solidifies into a weld joint that weld bonds the two workpieces together.

Resistance spot welding a steel and an aluminum workpiece, however, can be challenging since the two metals possess different properties that tend to complicate the welding process. Specifically, aluminum has a relatively low melting point (~600° C.) and relatively low electrical and thermal resistivities, while steel has a relatively high melting point (~1,500° C.) and relatively high electrical and thermal resistivities. As a consequence of these differences in material properties, most of the heat is generated within the steel workpiece during current flow such that a heat imbalance exists between the steel workpiece (higher temperature) and the aluminum workpiece (lower temperature). The combination of the heat imbalance created during current flow and the high thermal conductivity of the aluminum workpiece means that, immediately after the electrical current flow is terminated, a situation occurs in which heat is not disseminated symmetrically from the weld zone. Instead, heat is conducted from the hotter steel workpiece through the aluminum workpiece toward the welding electrode on the other side of the aluminum workpiece, which creates a steep thermal gradient in that direction.

The development of a steep thermal gradient between the steel workpiece and the welding electrode on the other side of the aluminum workpiece is believed to weaken the resultant weld joint in one or more ways. For instance, the elevated temperature generated in the steel workpiece promotes the growth of a hard and brittle Fe—Al intermetallic layer within the weld joint and contiguous with the faying surface of the steel workpiece. If the Fe—Al intermetallic layer grows sufficiently thick at and along the faying surface, it is thought, the final weld joint consequently tends to possess reduced peel and cross-tension strengths. This has been shown especially to be the case when steel workpieces of thinner gauge—e.g., between about 0.5 millimeters (mm) and 1.5 mm thickness—are used as part of the workpiece stack-up, and when steel workpieces of lower strength are used as part of the workpiece stack-up.

In view of these challenges, previous efforts to spot weld an aluminum workpiece and a steel workpiece have employed a weld schedule that specifies higher currents, longer weld times, or a combination of both (as compared to spot welding steel-to-steel), in order to try and obtain a reasonable weld bond area. Such efforts have been largely unsuccessful in a manufacturing setting and have a tendency to damage the welding electrodes. Given that previous spot welding efforts have not been particularly successful, mechanical fasteners including self-piercing rivets and flow-drill screws have predominantly been used instead. Mechanical fasteners, however, take longer to put in place and have high consumable costs compared to spot welding. They also add weight to the vehicle—weight that is avoided when joining is accomplished by way of spot welding—that offsets some of the weight savings attained through the use of an aluminum workpiece in the first place. Advancements in spot welding that would make it easier to join aluminum and steel workpieces would thus be a welcome addition to the art.

SUMMARY

According to an embodiment of the present disclosure, a first method of resistance spot welding a workpiece stack-up that includes at least a steel workpiece and an aluminum workpiece includes several steps. One step involves attaching a steel plate to the steel workpiece at a weld-site of the workpiece stack-up. Another step involves clamping a first welding electrode and a second welding electrode on the workpiece stack-up at the weld-site. Another step involves passing electrical current between the first welding electrode and the second welding electrode at the weld-site. The passing of electrical current creates a molten aluminum weld pool within the aluminum workpiece that wets a faying surface of the steel workpiece. Yet another step involves terminating passage of electrical current between the first and second welding electrodes. The termination of passing electrical current allows the molten aluminum weld pool to solidify into a weld joint. The steel plate serves to stiffen the weld joint that bonds the steel and aluminum workpieces together.

In the aforementioned first method, attaching the steel plate involves applying adhesive between the steel plate and the steel workpiece.

In the aforementioned first method, attaching the steel plate involves resistance spot welding the steel plate to the steel workpiece.

In the aforementioned first method, attaching the steel plate involves applying adhesive between the steel plate and the steel workpiece, subsequently performing the step of clamping the first and second welding electrodes on the workpiece stack-up and the steel plate at the weld-site, and then subsequently performing the step of passing electrical current between the first and second welding electrodes at the weld-site. The electrical current being passed through the applied adhesive between the steel plate and the steel workpiece.

In the aforementioned first method, another step involves curing the adhesive applied between the steel plate and the steel workpiece subsequent to the step of passing electrical current between the first and second welding electrodes at the weld-site.

In the aforementioned first method, attaching the steel plate to the steel workpiece involves applying adhesive between the steel plate and the steel workpiece subsequent to the step of clamping the first and second welding electrodes on the workpiece stack-up at the weld-site and subsequent to the step of passing electrical current between the first and second welding electrodes at the weld-site.

In the aforementioned first method, another step involves curing the adhesive applied between the steel plate and the steel workpiece.

In the aforementioned first method, further involving clamping the first and second welding electrodes on the workpiece stack-up and the steel plate with the adhesive applied between the steel plate and the steel workpiece, and passing electrical current between the first and second welding electrodes at the weld-site. The electrical current being passed through the applied adhesive between the steel plate and the steel workpiece.

In the aforementioned first method, further involving curing the adhesive applied between the steel plate and the steel workpiece subsequent to the electrical current being passed through the applied adhesive between the steel plate and the steel workpiece.

In the aforementioned first method, attaching the steel plate to the steel workpiece involves resistance spot welding the steel plate to the steel workpiece subsequent to the step of clamping the first and second welding electrodes on the workpiece stack-up at the weld-site and subsequent to the step of passing electrical current between the first and second welding electrodes at the weld-site.

In the aforementioned first method, further involving clamping the first and second welding electrodes on the workpiece stack-up and the steel plate at the weld-site, and passing electrical current between the first and second welding electrodes at the weld-site in order to form a weld joint between the steel plate and the steel workpiece.

In the aforementioned first method, further involving locating the steel plate adjacent a surface of the steel workpiece at the weld-site prior to the step of clamping the first and second welding electrodes, and subsequently performing the step of clamping the first and second welding electrodes on the workpiece stack-up and the steel plate at the weld-site, and then subsequently performing the step of passing electrical current between the first and second welding electrodes at the weld-site.

In the aforementioned first method, a first weld joint between the steel workpiece and the aluminum workpiece is formed concurrently with the formation of a second weld joint formed between the steel plate and the steel workpiece.

In the aforementioned first method, a first weld joint between the steel workpiece and the aluminum workpiece is formed prior to the formation of a second weld joint formed between the steel plate and the steel workpiece.

In the aforementioned first method, a first weld joint between the steel workpiece and the aluminum workpiece is formed subsequent to the formation of a second weld joint formed between the steel plate and the steel workpiece.

In the aforementioned first method, attaching the steel plate to the steel workpiece involves resistance spot welding the steel plate to the steel workpiece prior to the step of clamping the first and second welding electrodes, and prior to the step of passing electrical current between the first and second welding electrodes.

In the aforementioned first method, the step of clamping the first and second welding electrodes includes clamping the first and second welding electrodes on the workpiece stack-up at the weld-site with the steel plate resistance spot welded to the steel workpiece.

In the aforementioned first method, the steel plate is a unitary extension of the steel workpiece and the steel plate resides at a peripheral edge of the steel workpiece.

In the aforementioned first method, the steel plate is a unitary extension of the steel workpiece and the steel plate resides at an interior site of the steel workpiece and inboard of a peripheral edge of the steel workpiece.

According to an embodiment of the present disclosure, a second method of resistance spot welding a workpiece stack-up that includes at least a steel workpiece and an aluminum workpiece includes several steps. One step involves attaching a steel plate to the steel workpiece at a weld-site of the workpiece stack-up. Another step involves passing electrical current between a first welding electrode and a second welding electrode at the weld-site. The passing of electrical current creates a molten aluminum weld pool within the aluminum workpiece that wets a faying surface of the steel workpiece. Yet another step involves terminating passage of electrical current between the first and second welding electrodes. The termination of passing electrical current allows the molten aluminum weld pool to solidify into a weld joint. The steel plate has an attachment to the steel workpiece solely at the weld-site, and lacks attachment to the steel workpiece elsewhere.

DETAILED DESCRIPTION

The methods and assemblies detailed in this description resolve shortcomings encountered when resistance spot welding workpiece stack-ups having one or more steel workpieces and one or more aluminum or aluminum alloy (referred to collectively as "aluminum") workpieces. A steel plate is added to the workpiece stack-up and is appended to a steel-side of the workpiece stack-up. The steel plate serves to stiffen a weld joint established between the steel workpiece(s) and aluminum workpiece(s) in order to minimize and, in some cases, altogether preclude fracture of an Fe—Al intermetallic layer that may grow within the weld joint. The weld joint is in turn strengthened. The steel plate has been shown to have particular effectiveness when strengthening workpiece stack-ups and weld joints involving thinner gauge and/or lower strength steel workpieces. And while the methods and assemblies are described below in the context of vehicle body parts, skilled artisans will appreciate that the methods and assemblies can be employed in other contexts such as aerospace, marine, railway, building construction, and industrial equipment applications, among others.

Figure 1:
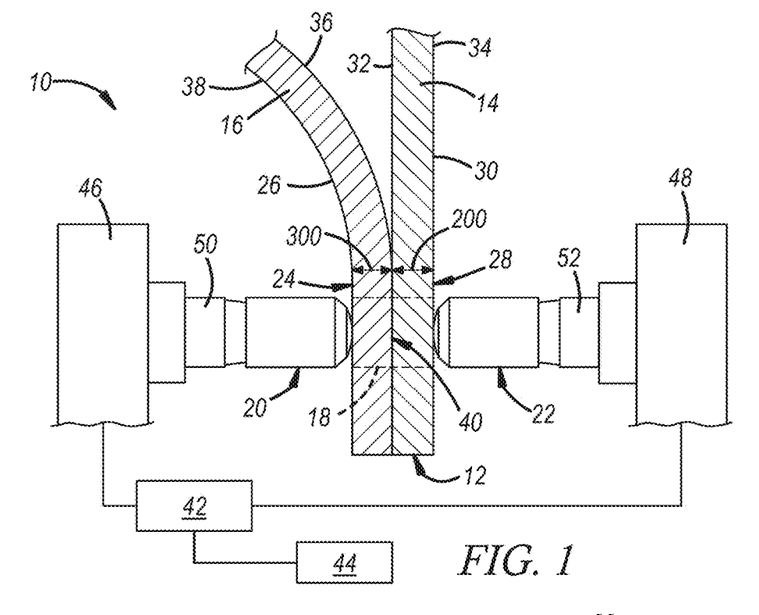
FIG. 1 is a side view of a resistance spot welding assembly, with a workpiece stack-up depicted in sectional view.

Referring now to FIG. 1, an example of a resistance spot welding assembly 10 is depicted that can be used to resistance spot weld a workpiece stack-up 12. The example of FIG. 1 does not show the steel plate and is instead referenced to describe other components of the resistance spot welding assembly 10; but it should be appreciated that the steel plate could indeed be employed with the example of FIG. 1, as demonstrated by FIG. 6 and the associated description. The workpiece stack-up 12 may include a steel workpiece 14 and an aluminum workpiece 16 that overlap and lie adjacent to each other at a weld site 18. The methods and assemblies detailed in this description are broadly applicable to a wide variety of workpiece stack-up configurations that include the adjacent pair of steel and aluminum workpieces 14, 16. The workpiece stack-up 12 may, for example, include only the steel workpiece 14 and the aluminum workpiece 16 (as far as the number of workpieces present), or it may include an additional aluminum workpiece (aluminum-aluminum-steel) or an additional steel workpiece (aluminum-steel-steel) so long as the two workpieces of the same base metal composition are situated next to each other in the workpiece stack-up 12. The workpiece stack-up 12 may even include more than three workpieces such as an aluminum-aluminum-steel-steel stack-up, an aluminum-aluminum-aluminum-steel stack-up, or an aluminum-steel-steel-steel stack-up. The steel and aluminum workpieces 14, 16 may be worked or deformed before or after being assembled into the workpiece stack-up 12, depending on the part being manufactured and the specifics of the overall manufacturing process.

FIG. 1 also depicts a first welding electrode 20 and a second welding electrode 22 that are mechanically and electrically configured on a weld gun (partially shown, described below). The workpiece stack-up 12 has a first side 24 provided by an aluminum workpiece surface 26 and a second side 28 provided by a steel workpiece surface 30. The two sides 24, 28 of the workpiece stack-up 12 are accessible to the set of welding electrodes 20, 22, respectively, at the weld site 18; that is, the first welding electrode 20 is arranged to make contact with and be pressed against the first side 24 of the workpiece stack-up 12, while the second welding electrode 22 is arranged to make contact with and be pressed against the second side 28. And while only one weld site 18 is depicted in the figures, skilled artisans will appreciate that spot welding may be practiced with the first and second welding electrodes 20, 22 according to the methods and assemblies detailed in this description at multiple different weld sites on the same workpiece stack-up.

The steel workpiece 14 includes a steel substrate from any of a wide variety of strengths and grades that is either coated or uncoated. The steel substrate may be hot-rolled or cold-rolled and may be composed of steel such as mild steel, interstitial-free steel, bake-hardenable steel, high-strength low-alloy (HSLA) steel, dual-phase (DP) steel, complex-phase (CP) steel, martensitic (MART) steel, transformation induced plasticity (TRIP) steel, twining induced plasticity (TWIP) steel, and boron steel such as when the steel workpiece 14 includes press-hardened steel (PHS). Preferred compositions of the steel substrate, however, include mild steel, dual phase steel, and boron steel used in the manufacture of press-hardened steel. Those three types of steel have ultimate tensile strengths that, respectively, range from 150 MPa to 350 MPa, from 500 MPa to 1100 MPa, and from 1200 MPa to 1800 MPa.

The steel workpiece 14 may include a surface layer on one side or both sides of the steel substrate. If a surface layer is present, the steel substrate preferably includes a surface layer of zinc (galvanized), a zinc-iron alloy (galvanneal), a zinc-nickel alloy, nickel, aluminum, an aluminum-magnesium alloy, an aluminum-zinc alloy, or an aluminum-silicon alloy, any of which may have a thickness of up to 50 μm and may be present on each side of the steel substrate. Taking into account the thickness of the steel substrate and any surface layer that may be present, the steel workpiece 14 may have a thickness 200 that ranges from 0.3 millimeters (mm) to 6.0 mm, or more narrowly from 0.5 mm to 2.5 mm, at least at the weld site 18. Further, the steel workpiece 14 may have a thinner gauge in which the thickness 200 ranges from 0.5 mm to 1.5 mm. The term "steel workpiece" as used herein thus encompasses a wide variety of steel substrates, whether coated or uncoated, of different grades and strengths.

The aluminum workpiece 16 includes an aluminum substrate that is either coated or uncoated. The aluminum substrate may be composed of unalloyed aluminum or an aluminum alloy that includes at least 85 wt % aluminum. Some notable aluminum alloys that may constitute the coated or uncoated aluminum substrate are an aluminum-magnesium alloy, an aluminum-silicon alloy, an aluminum-magnesium-silicon alloy, and an aluminum-zinc alloy. If coated, the aluminum substrate may include a surface layer of a refractory oxide material comprised of aluminum oxide compounds and possibly other oxide compounds as well, such as magnesium oxide compounds if, for example, the aluminum substrate is an aluminum-magnesium alloy. Such a refractory oxide material may be a native oxide coating that forms naturally when the aluminum substrate is exposed to air and/or an oxide layer created during exposure of the aluminum substrate to elevated temperatures during manufacture, e.g., a mill scale. The aluminum substrate may also be coated with a layer of zinc, tin, or a metal oxide conversion coating comprised of oxides of titanium, zirconium, chromium, or silicon, as described in US Pat. Pub. No. 2014/0360986. The surface layer may have a thickness ranging from 1 nm to 10 μm and may be present on each side of the aluminum substrate. Taking into account the thickness of the aluminum substrate and any optional surface layer that may be present, the aluminum workpiece 16 may have a thickness 300 that ranges from 0.3 mm to about 6.0 mm, or more narrowly from 0.5 mm to 3.0 mm, at least at the weld site 18.

The aluminum substrate of the aluminum workpiece 16 may be provided in wrought or cast form. For example, the aluminum substrate may be composed of a 4xxx, 5xxx, 6xxx, or 7xxx series wrought aluminum alloy sheet layer, extrusion, forging, or other worked article. Alternatively, the aluminum substrate may be composed of a 4xx.x, 5xx.x, 6xx.x, or 7xx.x series aluminum alloy casting. Some more specific kinds of aluminum alloys that may constitute the aluminum substrate include, but are not limited to, AA5754 and AA5182 aluminum-magnesium alloy, AA6111 and AA6022 aluminum-magnesium-silicon alloy, AA7003 and AA7055 aluminum-zinc alloy, and Al-10Si-Mg aluminum die casting alloy. The aluminum substrate may further be employed in a variety of tempers including annealed (O), strain hardened (H), and solution heat treated (T), if desired. The term "aluminum workpiece" as used herein thus encompasses unalloyed aluminum and a wide variety of aluminum alloys, whether coated or uncoated, in different spot-weldable forms including wrought sheet layers, extrusions, forgings, etc., as well as castings.

When the two workpieces 14, 16 are stacked-up for spot welding in the context of a "2T" stack-up embodiment, which is illustrated in FIG. 1, the steel workpiece 14 and the aluminum workpiece 16 present the first and second sides 24, 28 of the workpiece stack-up 12, respectively. In particular, the steel workpiece 14 includes a faying surface 32 and a back surface 34 and, likewise, the aluminum workpiece 16 includes a faying surface 36 and a back surface 38. The faying surfaces 32, 36 of the two workpieces 14, 16 overlap and confront each other to establish a faying interface 40 that extends through the weld site 18. The back surfaces 34, 38 of the steel and aluminum workpieces 14, 16, on the other hand, face away from one another in opposite directions at the weld site 18 and constitute, respectively, the aluminum workpiece surface 26 and the steel workpiece surface 30 of the first and second sides 24, 28 of the workpiece stack-up 12.

The term "faying interface 40" is used broadly in the present disclosure and is intended to encompass any overlapping and confronting relationship between the faying surfaces 32, 36 of the workpieces 14, 16 in which resistance spot welding can be practiced. The faying surfaces 32, 36, for example, may be in direct contact with each other such that they physically abut and are not separated by a discrete intervening material layer. As another example, the faying surfaces 32, 36 may be in indirect contact with each other such as when they are separated by a discrete intervening material layer—and thus do not experience the type of interfacial physical abutment found in direct contact—yet are in close enough proximity to each other that resistance spot welding can still be practiced. This type of indirect contact between the faying surfaces 32, 36 of the steel and aluminum workpieces 14, 16 typically results when an intermediate organic material layer (not shown) is applied between the faying surfaces 32, 36 before the workpieces 14, 16 are stacked against each other during formation of the workpiece stack-up 12.

An intermediate organic material layer that may be present between the faying surfaces 32, 36 is an adhesive layer that includes a structural thermosetting adhesive matrix. The structural thermosetting adhesive matrix may be any curable structural adhesive including, for example, as a heat-curable epoxy or a heat-curable polyurethane. Some specific examples of heat-curable structural adhesives that may be used as the adhesive matrix include DOW Betamate 1486, Henkel Terokal 5089, and Uniseal 2343, all of which are commercially available. Additionally, the adhesive layer may further include optional filler particles, such as silica particles, dispersed throughout the thermosetting adhesive matrix to modify the viscosity profile or other properties of the adhesive layer for manufacturing operations. The intermediate organic material layer, whether an adhesive layer or some other organic material, such as a sealer or soundproofing layer, preferably has a thickness through the weld site 18 that ranges from 0.1 mm to 2.0 mm or, more narrowly, from 0.2 mm to 1.0 mm.

The intermediate organic material layer, if present, can be spot welded through rather easily at the temperatures and electrode clamping pressures attained at the weld site 18 during current flow. Under spot welding conditions, the organic material layer is laterally displaced and thermally decomposed within the site 18 during current flow to leave behind only residual materials (e.g., carbon ash, filler particles, etc.) near the faying surface 32 of the steel workpiece 14. Outside of the weld site 18, however, the intermediate organic material layer remains generally undisturbed. In that regard, if the intermediate organic material layer is an adhesive layer, as described above, the adhesive layer is available to provide additional bonding between the faying surfaces 32, 36 of the steel and aluminum workpieces 14, 16. To achieve such additional bonding, the workpiece stack-up 12 may be heated in an ELPO-bake oven or other heating apparatus following spot welding to cure the structural thermosetting adhesive matrix of the adhesive layer that is still intact around the weld site 18.

Still referring to FIG. 1, the first welding electrode 20 and the second welding electrode 22 are used to pass electrical current through the workpiece stack-up 12 and across the faying interface 40 of the adjacent steel and aluminum workpieces 14, 16 at the weld site 18 regardless of whether an additional aluminum and/or steel workpiece is present. Each of the welding electrodes 20, 22 is carried by a weld gun (partially shown) of any suitable type including a C-type or an X-type weld gun. The spot welding operation may call for the weld gun to be mounted to a robot capable of moving the weld gun around the workpiece stack-up 12 as needed, or it may call for the weld gun to be configured as a stationary pedestal-type in which the workpiece stack-up 12 is manipulated and moved relative to the weld gun. These kinds of welding operations are common in automotive manufacturing plants, for instance. Additionally, as illustrated schematically here, the weld gun may be associated with a power supply 42 that delivers electrical current between the welding electrodes 20, 22 according to a programmed weld schedule administered by a weld controller 44. The weld gun may also be fitted with coolant lines and associated control equipment in order to deliver a coolant fluid, such as water, to each of the welding electrodes 20, 22 during spot welding operations.

The weld gun includes a first gun arm 46 and a second gun arm 48. The first gun arm 46 is fitted with a shank 50 that secures and retains the first welding electrode 20 and the second gun arm 48 is fitted with a shank 52 that secures and retains the second welding electrode 22. The secured retention of the welding electrodes 20, 22 on their respective shanks 50, 52 can be accomplished by way of shank adapters that are located at axial free ends of the shanks 50, 52 and received by the electrodes 20, 22 as shown and described with respect to FIG. 1. In terms of their positioning relative to the workpiece stack-up 12, the first welding electrode 20 is positioned for contact with the first side 24 of the stack-up 12, and, in turn, the second welding electrode 22 is positioned for contact with the second side 28 of the stack-up 12. The first and second weld gun arms 46, 48 are operable to converge or pinch the welding electrodes 20, 22 towards each other and to impose a clamping force on the workpiece stack-up 12 at the weld site 18 once the electrodes 20, 22 are brought into contact with their respective workpiece stack-up sides 24, 28.

Figure 2:
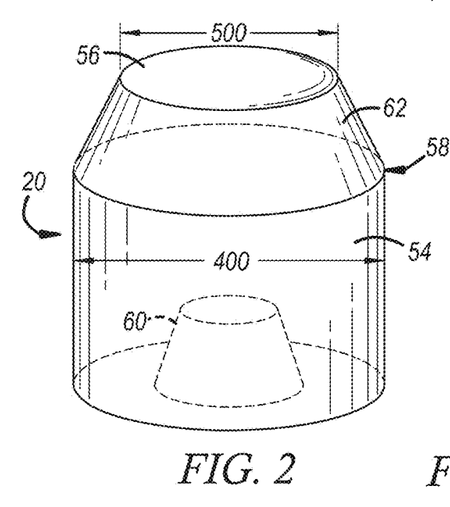
FIG. 2 is a perspective view of a welding electrode that may be used in the resistance spot welding assembly of FIG. 1.
Figure 3:
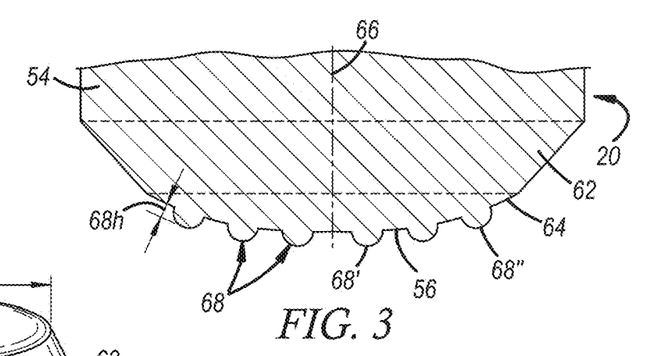
FIG. 3 is a partial sectional view of a first welding electrode that may be used in the resistance spot welding assembly of FIG. 1.

Referring now to FIGS. 2-3, the first welding electrode 20 is designed and constructed for pressing against an aluminum workpiece, like the aluminum workpiece 16. The first welding electrode 20 can be composed of a suitable copper alloy material such as C15000, and/or can be at least in part composed of a refractory-based material such as a tungsten-copper alloy; still, other copper alloy compositions, as well as other metal compositions, that possess suitable mechanical properties and suitable electrical and thermal conductivity properties may also be used. The first welding electrode 20 in the embodiment of the figures has a body 54 and a weld face 56. The body 54 is cylindrical in shape and has a front end 58 with a diameter 400 that can range between approximately 12 mm and 22 mm, or more narrowly between approximately 16 mm and 20 mm. The body 54 includes an accessible internal recess 60 for insertion of, and attachment with, a shank adaptor (not shown) of the shank 50 associated with the first gun arm 46. The weld face 56 is disposed on the front end 58 of the body 54 and can be upwardly displaced from the front end 58 by a transition nose 62, or it may span the entire front end 58 (termed a "full face electrode"). The weld face 56 has a diameter 500 that preferably lies within the range of 6 mm to 20 mm or, more narrowly, within the range of 8 mm to 15 mm. Moreover, if the transition nose 62 is present, the transition nose 62 may upwardly displace the weld face 56 from the front end 58 by a distance of 2 mm to 10 mm. The transition nose 62 is preferably frustoconical or truncated spherical in shape. If frustoconical, the angle of truncation of the transition nose 62 is preferably between 30° and 60° from a horizontal plane of the weld face 56. If truncated spherical, the radius of curvature of the transition nose 62 is preferably between 6 mm and 12 mm.

A broad range of electrode weld face designs may be implemented for the first welding electrode 20. The weld face 56, for example, and referring now particularly to FIG. 3, may include a base weld face surface 64 that is planar or spherically domed. If spherically domed, the base weld face surface 64 has a spherical profile with a radius of curvature that preferably ranges from 15 mm to 300 mm or, more narrowly, from 20 mm to 50 mm. Still, various convex weld face geometries can be used for the first welding electrode 20. Yet further, the electrode weld face designs described and depicted in U.S. patent application Ser. No. 15/807,219 to the present applicant with a filing date of Nov. 8, 2017 can be implemented for the first welding electrode 20, which is hereby incorporated by reference in its entirety. The first welding electrode 20 could also have a pointed weld face design with a truncated cone that has taper angles from a weld face center; in this example, the taper angle could range between 3 degrees (°) and 12°, or more preferably between 5° and 8°. Moreover, regardless of whether the base weld face surface 64 is planar, spherically domed, convex, angled, or has another weld face design, the base weld face surface 64 may be smooth or roughened. The weld face 56 may also include a central projection such as a raised plateau or spherical ball-nose projection centered about a weld face axis 66. Still further, the weld face 56 may include a series of upstanding concentric rings of circular ridges that project outwardly from the base weld face surface 64 such as the ridges disclosed in U.S. Pat. Nos. 8,222,560; 8,436,269; 8,927,894; or in U.S. Pat. Pub. 2013/0200048.

In a preferred embodiment of the first welding electrode 20, the weld face 56 includes a plurality of upstanding circular ridges 68 that are centered about and surround the weld face axis 66, as shown in FIG. 3. The base weld face surface 64 accounts for 50% or greater, and preferably between 50% and 80%, of the surface area of the weld face 56, and the remaining surface area of the weld face 56 is attributed to the plurality of upstanding circular ridges 68. While the number of upstanding ridges 68 present on the base weld face surface 64 may vary, the weld face 56 preferably includes anywhere from two to ten ridges 68, or more narrowly from three to six ridges 68. The several upstanding circular ridges 68 are radially spaced apart from each other on the base weld face surface 64 such that the upstanding ridges 68 become larger in diameter when moving from the innermost upstanding ridge 68' that immediately surrounds the weld face axis 66 to the outermost upstanding ridge 68" that is farthest away from the weld face axis 66.

The size and shape of the upstanding circular ridges 68 are designed to improve mechanical stability and reduce the electrical and thermal contact resistance at the electrode/workpiece junction while at the same time being easily redressable. In one embodiment, as shown, each of the upstanding circular ridges 68 has a closed circumference, meaning the circumference of the ridge 68 is not interrupted by significant separations, with a cross-sectional profile that lacks sharp corners and has a curved (as shown in FIG. 3) or flat top surface. Each of the circular ridges 68 also has a ridge height 68h—taken at the midpoint of the ridge 68—that extends upwards and is positively displaced from the base weld face surface 64 when viewed in cross-section. The ridge height 68h of each ridge 68 preferably ranges from 20 µm to 500 µm or, more narrowly, from 50 µm to 300 µm. And the spacing of the ridges 68 measured between the centers of each pair of adjacent neighboring ridges 68 preferably ranges from 100 µm to 2500 µm or, more narrowly, from 400 µm to 1600 µm.

The second welding electrode 22 employed opposite the first welding electrode 20 can be any of a wide variety of electrode designs. In some instances, it is preferable that the first and second welding electrodes 20, 22 have similar designs, though this is not necessary in all embodiments. Generally, as shown best in FIG. 4, the second welding electrode 22 includes an electrode body 70 and a weld face 72. The electrode body 70 is preferably cylindrical in shape and includes an accessible internal recess 74 for insertion of, and attachment with, a shank adapter (not shown) of the shank 52 associated with the second gun arm 48. A front end 74 of the electrode body 70 has a diameter 600 that lies within the range of 12 mm to 22 mm or, more narrowly, within the range of 16 mm to 20 mm. The weld face 72 is disposed on the front end 74 of the body 70 and may be upwardly displaced from the front end 74 by a transition nose 76 or it may transition directly from the front end 74 (termed a "full face electrode"). Moreover, if a transition nose 76 is present, the weld face 72 may be upwardly displaced from the front end 74 by a distance of 2 mm to 10 mm. The transition nose 76 is preferably frustoconical or truncated spherical in shape. If frustoconical, the angle of truncation of the nose 76 is preferably between 15° and 50° from a horizontal plane of the weld face 72. If truncated spherical, the radius of curvature of the nose 76 is preferably between 6 mm and 12 mm.

Figure 4:
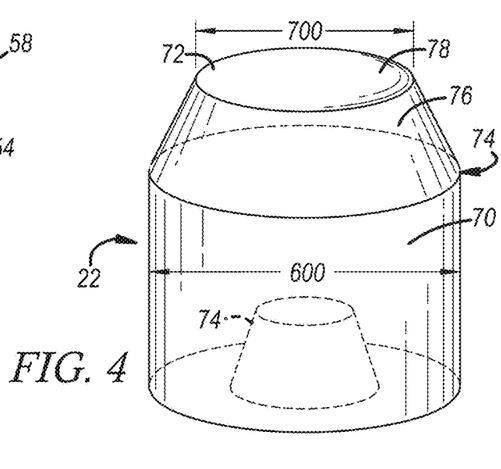
FIG. 4 is a partial sectional view of a second welding electrode that may be used in the resistance spot welding assembly of FIG. 1.

The weld face 72 is the portion of the second welding electrode 22 that makes contact with the second side 28 of the workpiece stack-up 12 in the example of FIG. 1. In some instances, it is preferable that the weld face 72 has a similar weld face design as that of the weld face 56 of the first welding electrode 20, though this is not necessary in all embodiments. In an embodiment, the weld face 72 preferably has a diameter 700 that lies within the range of 3 mm to 16 mm or, more narrowly, within the range of 4 mm to 8 mm. In terms of its profile, the weld face 72 includes a base weld face surface 78 that may be planar or spherically domed. If spherically domed, the base weld face surface 78 has a spherical profile with a radius of curvature that preferably lies within the range of 25 mm to 400 mm or, more narrowly, within the range of 25 mm to 100 mm. The base weld face surface 78 may be smooth or it may include raised surface features such as a plateau surface that is positively displaced above the base weld face surface 78 about the center of the weld face 72, a rounded projection that rises above the base weld face surface 78 about the center of the weld face 72, a plurality of upstanding circular ridges similar to those described above, or some other raised feature.

The second welding electrode 22 may be constructed from any electrically and thermally conductive material suitable for spot welding applications. For example, the second welding electrode 22 may be constructed from a copper alloy having an electrical conductivity of at least 80% IACS, or more preferably at least 90% IACS, and a thermal conductivity of at least 300 W/mK, or more preferably at least 350 W/mK. One specific example of a copper alloy that may be used for the second welding electrode 22 is a copper-zirconium alloy (CuZr) that contains about 0.10 wt % to about 0.20 wt % zirconium and the balance copper. Copper alloys that meet this constituent composition and are designated C15000 are generally preferred. Other copper alloy compositions such as a copper-chromium alloy or a copper-chromium-zirconium alloy may also be used. Still further, other metal compositions not explicitly recited here that possess suitable mechanical properties as well as electrical thermal conductivity properties may be employed.

An example of a resistance spot welding method will now be described with reference to FIG. 1, which depicts only the steel and aluminum workpieces 14, 16 that overlap and lie adjacent to each other so as to establish the faying interface 40. The presence of additional workpieces in the workpiece stack-up 12 including, for example, the addition of aluminum or steel workpieces as described above, does not necessarily impact how the spot welding method is carried out or have any substantial effect on the joining mechanism that takes place at the faying interface 40 of the adjacent steel and aluminum workpieces 14, 16.

At the onset of the example resistance spot welding method, which is depicted in FIG. 1, the workpiece stack-up 12 is located between the first welding electrode 20 and the opposed second welding electrode 22. The weld face 56 of the first welding electrode 20 is positioned to contact the aluminum workpiece surface 26 of the first side 24, and the weld face 72 of the second welding electrode 22 is positioned to contact the steel workpiece surface 30 of the second side 28. The weld gun is then operated to converge the first and second welding electrodes 20, 22 relative to each other so that their respective weld faces 56, 72 are pressed against the opposite first and second sides 24, 28 of the workpiece stack-up 12 at the weld site 18. The first and second welding electrodes 20, 22 are clamped down on the workpiece stack-up 12. The weld faces 56, 72 are typically facially aligned with each other at the weld site 18 under a clamping force imposed on the workpiece stack-up 12. The imposed clamping force preferably ranges from 400 lb (pounds force) to 2000 lb or, more narrowly, from 600 lb to 1300 lb.

After the weld faces 56, 72 of first and second welding electrodes 20, 22 are pressed against the first and second sides 24, 28 of the workpiece stack-up 12, respectively, electrical current is passed between the facially aligned weld faces 56, 72. The electrical current exchanged between the weld faces 56, 72 can be an AC (alternating current) electrical current or a DC (direct current) electrical current that is delivered by the power supply 42 which, as shown, electrically communicates with the first and second welding electrodes 20, 22. Due to the precise control of applied current, a medium-frequency direct current (MFDC) inverter power supply that includes a MFDC transformer is preferred in some embodiments. A MFDC transformer can be obtained commercially from a number of suppliers including Roman Manufacturing (Grand Rapids, Mich.), ARO Welding Technologies (Chesterfield Township, Mich.), and Bosch Rexroth (Charlotte, N.C.). The characteristics of the delivered electrical current are controlled by the weld controller 44. Specifically, the weld controller 44 allows a user to program a weld schedule that dictates the manner in which the electrical current is exchanged between the welding electrodes 20, 22. The weld schedule allows for customized control of the current level at any given time and the duration of current flow at any given current level, among others, and further allows for such attributes of the electrical current to be responsive to changes in very small time increments down to fractions of a millisecond.

The electrical current exchanged between the welding electrodes 20, 22 passes through the workpiece stack-up 12 and across the faying interface 40 established between the adjacent steel and aluminum workpieces 14, 16. The exchanged electrical current may be constant or pulsed over time, or some combination of the two, and typically has a current level that ranges from 5 kA and 50 kA and lasts for a duration of 50 ms to 5000 ms or more preferably for a duration of 200 ms to 2000 ms. In general, resistance to this flow of electrical current generates heat and eventually melts the aluminum workpiece 16 to create a molten aluminum weld pool within the aluminum workpiece 16. The molten aluminum weld pool wets the adjacent faying surface 32 of the steel workpiece 14 and extends into the aluminum workpiece 16 towards the back surface 38. The molten aluminum weld pool may penetrate a distance into the aluminum workpiece 16 that ranges from 10% to 100% and more preferably from 20% to 100% of the thickness 300 of the aluminum workpiece 16 at the weld site 18. And, in terms of its composition, the molten aluminum weld pool is composed predominantly of aluminum material derived from the aluminum workpiece 16.

Figure 5:
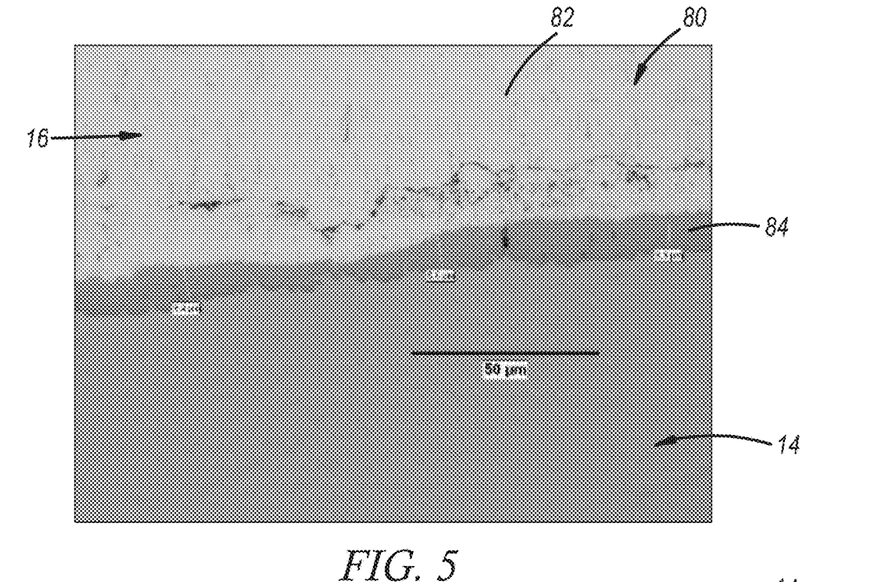
FIG. 5 is a microstructure of a weld nugget showing an intermetallic layer thereof.

Referring now to the microstructure of FIG. 5, the molten aluminum weld pool solidifies into a weld joint 80 that weld bonds the steel and aluminum workpieces 14, 16 together after the passage of electrical current between the weld faces 56, 72 of the first and second welding electrodes 20, 22 ceases. The weld joint 80 illustrated in FIG. 5 is representative of a weld joint formed by a conventional resistance welding process that does not employ the steel plate detailed in this description. The weld joint 80 includes an aluminum weld nugget 82 comprised of resolidified material of the aluminum workpiece 16, and may also include one or more intermetallic layers 84. The aluminum weld nugget 82 extends into the aluminum workpiece 16 to a distance that often ranges from 20% to 100% of the thickness 300 of the aluminum workpiece 16 at the weld site 18, similar to the pre-existing molten aluminum weld pool. The intermetallic layer(s) 84 are situated between the aluminum weld nugget 82 and the faying surface 32 of the steel workpiece 14. The intermetallic layer(s) 84 are produced due to a reaction between the molten aluminum weld pool and the steel workpiece 14 at spot welding temperatures, particularly sustained spot welding temperatures, and typically include $FeAl_3$ compounds, $Fe_2Al_5$ compounds, and possibly other intermetallic compounds, and exhibit a combined total thickness of 0.5 µm to 20 µm or 1 µm to 5 µm. The intermetallic layer(s) 84 are often hard and brittle and, if thick enough at and along the faying surface 32 of the steel workpiece 14, it is thought, the final weld joint 80 can consequently tend to possess a reduced peel and cross-tension strength due to fracturing of the intermetallic layer(s) 84 when the workpieces are subject to deformation. This has been found especially to be the case when the steel workpiece 14 has a thinner gauge with the thickness 200 ranging from 0.5 mm to 1.5 mm, and when the steel workpiece 14 possesses a lower strength with an ultimate tensile strength ranging from 150 MPa to 350 MPa.

To resolve these shortcomings and minimize and, in some cases, altogether preclude fracture of the intermetallic layer(s) 84 upon deformation, a steel plate, or backing plate, 86 is introduced into the workpiece stack-up 12. The steel plate 86 serves to thicken and stiffen the weld joint 80 and augment the strength thereof. Hence, the weld joint 80 possesses a greater peel and cross-tension strength than it would without the steel plate 86. Moreover, in certain instances, the strengthened weld joint 80 prompts any deformations that may occur thereat to be further borne by the aluminum workpiece 16 than may otherwise be the case. The steel plate 86 has been shown to be particularly effective when the steel workpiece 14 has a thinner gauge, a lower strength, or both (the general numerical ranges of which are presented above), since those attributes often make the weld site 18 more susceptible to deformation and thus fracture of the intermetallic layer(s) 84. The steel plate 86 may be composed of the same steel material as that of the steel workpiece 14, or may be composed of a steel material that exhibits compatibility in terms of attachment with the steel workpiece 14 whether the attachment involves adhesive bonding or resistance spot welding, as described below, and/or may be composed of a steel material that possesses a greater ultimate tensile strength than that of the steel workpiece 14. Further, while described with reference to the single weld site 18, skilled artisans should appreciate that multiple steel plates 86 can be introduced at multiple weld sites 18 on the same workpiece stack-up 12.

Figures 6, 8:
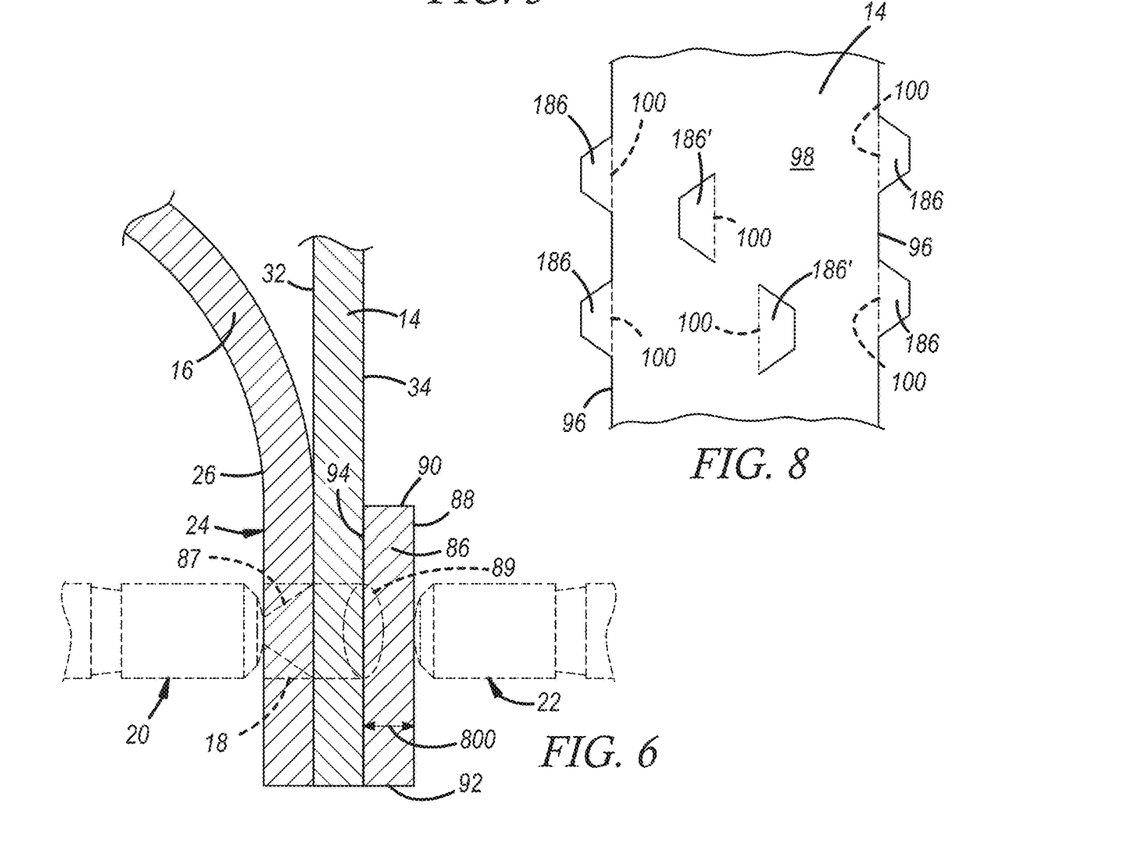
FIG. 6 is a side view of a workpiece stack-up having an embodiment of a steel plate.
FIG. 8 is a partial view of an embodiment of a steel workpiece showing examples of steel plates.

The steel plate 86 may take different forms in different embodiments depending in part by the attributes of the associated workpieces, the character of the resistance spot welding method carried out, and the attachment technique employed. In the embodiment of FIG. 6, the steel plate 86 is a separate and distinct piece that is initially detached from the steel workpiece 14 prior to its attachment to the steel workpiece 14. The steel plate 86 may have a thickness 800 that is less than 3.0 mm, ranges from 0.5 mm to 2.5 mm, or more narrowly ranges from 0.9 mm to 2.0 mm. Although not presented in the figures, the steel plate 86 may have different shapes when viewed from a back surface 88 thereof including rectangular, square, circle, oval, or the like. Whatever its shape, the steel plate 86 is sized to substantially or wholly overlay the weld site 18 in order to effectively stiffen the weld joint 80 thereat. In an embodiment, an area of the steel plate 86 defined by the back surface 88 or defined by a front surface 94 thereof can be twice or more a corresponding area defined by an associated aluminum weld nugget. Where the attachment between the steel plate 86 and the steel workpiece 14 involves resistance spot welding as described below, the area of the steel plate 86 can be dictated by the size of a weld nugget produced between the steel plate 86 and steel workpiece 14; here, the area of the back surface 88 or of the front surface 94 can range approximately between 12 $mm^2$ to 115 $mm^2$, or more narrowly between 20 $mm^2$ to 80 $mm^2$. Moreover, where the attachment between the steel plate 86 and the steel workpiece 14 involves resistance spot welding, the steel plate 86 can span from a central point of an associated aluminum weld nugget to a cross-wise extent that is 40% or more greater than a cross-wise extent measured from the central point of the aluminum weld nugget to an edge thereof (i.e., a radius of the aluminum weld nugget). Further, where the attachment between the steel plate 86 and the steel workpiece 14 involves adhesive bonding, the area of the steel plate 86 can be dictated by the area of adhesive application spread between the steel plate 86 and the steel workpiece 14. Moreover, where the attachment between the steel plate 86 and the steel workpiece 14 involves adhesive bonding, the steel plate 86 can span from a central point of an associated aluminum weld nugget to a cross-wise extent that is 40% or more greater than a cross-wise extent measured from the central point of the aluminum weld nugget to an edge thereof (i.e., a radius of the aluminum weld nugget). For instance, in FIG. 6 the steel plate 86 spans from a first side edge 90 to a second side edge 92 and across the corresponding bounds of the weld site 18. Similarly, though not shown, the steel plate 86 can span across the bounds of the weld site 18 in a transverse direction to that presented by the first and second side edges 90, 92. When put in place for attachment, and after attachment, the front surface 94 of the steel plate 86 can make surface-to-surface confrontation and/or surface-to-surface abutment with the back surface 34 of the steel workpiece 14. At this location, the steel plate 86 is situated on the steel-side of the workpiece stack-up 12.

Figure 7:
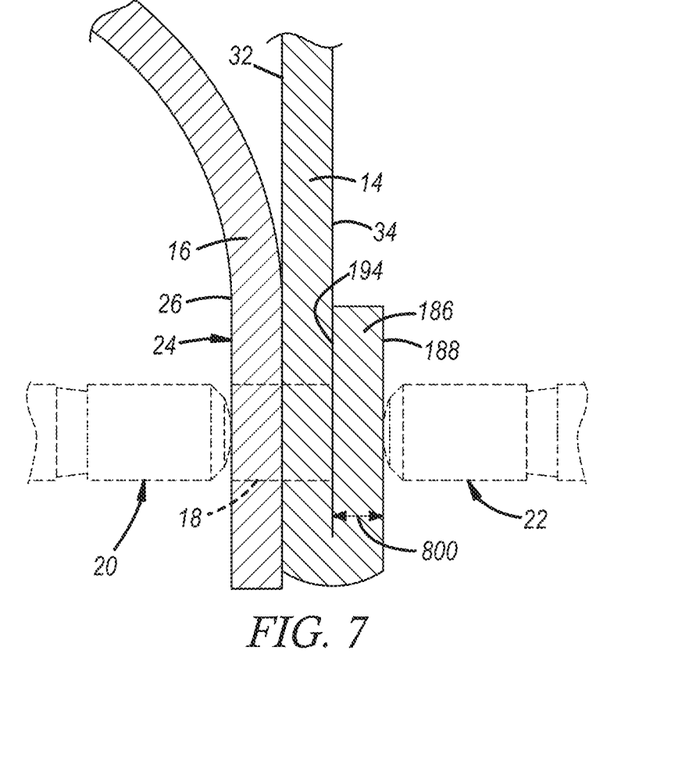
FIG. 7 is a side view of a workpiece stack-up having another embodiment of a steel plate.

Referring now to FIGS. 7 and 8, in this embodiment a steel plate 186 is a unitary extension of the steel workpiece 14. Here, rather than being separate from the steel workpiece 14 as in the previous embodiment, the steel plate 186 is a portion of the steel workpiece 14 that is folded back onto itself. Because it is segmented from the steel workpiece 14, the steel plate 186 can more readily possess the same thickness as the steel workpiece 14 and can more readily be composed of the same steel material as the steel workpiece 14, if so desired, although this need not be true in all cases of the steel plate 186. As with the previous embodiment, the steel plate 186 may have a thickness 800 that is less than 3.0 mm, ranges from 0.5 mm to 2.5 mm, or more narrowly ranges from 0.9 mm to 2.0 mm, and may have different shapes including rectangular, square, circle, oval, or the like. With specific reference to FIG. 8, depending on the particular vehicle structural frame or closure member involved, the steel plate 186 may reside at one or more peripheral edges 96 of the steel workpiece 14, the steel plate 186' may reside at an interior site 98 of the steel workpiece 14 and inboard of the peripheral edge(s) 96, or the steel plate 186, 186' may reside at a combination of at the peripheral edge(s) 96 and at the interior site 98. In order to prepare the steel workpiece 14 to have the steel plates 186, 186', the steel workpiece 14 can be constructed with tab-like structures at the peripheral edge(s) 96 to furnish the steel plate 186, and the steel workpiece 14 can be constructed with cut-through-lines at the interior site 98 to furnish the steel plate 186'. When at the peripheral edge(s) 96, multiple steel plates 186 can be located for use at multiple expected weld sites; and likewise, when at the interior site 98, multiple steel plates 186' can be located for use at multiple expected weld sites. In this embodiment, whether located peripherally or interiorly, the steel plate 186 is folded about a folding or hem line 100 (FIG. 8) to its attachment position as depicted in FIG. 7. The attachment position of FIG. 7 is a post-folding state of the steel plate 186, while a pre-folding state of the steel plate 186 is depicted in FIG. 8. The folding process can be effected via a mechanical press, roller hemmer, or by another metalworking procedure. With specific reference to FIG. 7, when folded and put in place for attachment, and after attachment, a front surface 194 of the steel plate 186 can make surface-to-surface confrontation and/or surface-to-surface abutment with the back surface 34 of the steel workpiece 14. At this location, as in the previous embodiment, the steel plate 186 is situated on the steel-side of the workpiece stack-up 12.

In both of the embodiments of FIGS. 6-8, the attachment technique employed between the steel plate 86, 186 and steel workpiece 14, as well as the order and timing of attachment, may vary. In an example, the steel plate 86, 186 is attached to the steel workpiece 14 by way of adhesive bonding. The adhesive bonding can involve different types of metal-to-metal adhesives including, for example, one part, heat curable epoxy adhesive such as Dow BETAMATE™ 1486, Henkel Terokal 5089, or UNISEAL 2343, all of which are commercially available. The adhesive can be applied to the front surface 94, 194 of the steel plate 86, 186, can be applied to the back surface 34 of the steel workpiece 14 at the site of attachment, or can be applied to both the front and back surfaces 94, 194, 34, so that adhesive material is sandwiched between the steel plate 86, 186 and the steel workpiece 14. The adhesive can be applied to all areas of surface-to-surface confrontation and/or surface-to-surface abutment between the steel plate 86, 186 and the steel workpiece 14. Upon curing, the steel plate 86, 186 and steel workpiece 14 are firmly attached together. The adhesive application step may be performed and may take place before or after the resistance spot welding method is carried out and the weld joint 80 is formed between the steel and aluminum workpieces 14, 16; when performed before, electrical current is passed through the applied adhesive and the steel plate 86, 186 is weld-bonded to the steel workpiece 14. Curing of the adhesive is performed after the resistance spot welding method is carried out. The exact curing technique executed may depend on the type of adhesive utilized and may include, among other possibilities, baking in a heated oven, induction heating, or, for a two-part adhesive, allowing the adhesive to cure at room temperature.

In another example, the steel plate 86, 186 is attached to the steel workpiece 14 by way of resistance spot welding. In general, the resistance spot welding method for attachment here may be the same or similar to the resistance spot welding method detailed above in relation to the steel and aluminum workpieces 14, 16 in terms of the characteristics set forth. The resistance spot welding method to join the steel plate 86, 186 to the steel workpiece 14 may occur before the resistance spot welding method to form the weld joint 80 between the steel and aluminum workpieces 14, 16. In this case, the first and second welding electrodes 20, 22 are respectively pressed against the faying surface 32 of the steel workpiece 14 and the back surface 88, 188 of the steel plate 86, 186 as the steel workpiece 14 and steel plate 86, 186 are overlapped. Once attached, the joined steel workpiece and plate assemblage is then overlapped with the aluminum workpiece 16—as illustrated in FIGS. 6 and 7—and the first and second welding electrodes 20, 22 are respectively pressed against the aluminum workpiece surface 26 of the first side 24 and the back surface 88, 188 of the steel plate 86, 186. This subsequent spot welding method may further grow the weld nugget previously produced between the steel workpiece 14 and the steel plate 86, 186 by the initial spot welding method. Further, in a currently preferred order and timing, the resistance spot welding method to join the steel plate 86, 186 to the steel workpiece 14 may occur concurrently and simultaneously with the resistance spot welding method to form the weld joint 80 between the steel and aluminum workpieces 14, 16. In other words, a single and the same resistance spot welding method can be utilized to join the steel plate 86, 186 and steel workpiece 14 together, as well as to join the steel and aluminum workpieces 14, 16 together. In this embodiment, the steel workpiece 14, the aluminum workpiece 16, and the steel plate 86, 186 are overlapped and the first and second welding electrodes 20, 22 are respectfully pressed against the aluminum workpiece surface 26 of the aluminum workpiece 16 and the back surface 88, 188 of the steel plate 86, 186. Here, and referring to FIG. 6, a first weld joint 87 is formed between the steel and aluminum workpieces 14, 16 adjacent the faying surface 32, and a second weld joint 89 is formed between the steel workpiece 14 and steel plate 86, 186 at a faying surface thereof (which happens to be the front surface 94, 194 specified in FIGS. 6 and 7). The first and second weld joints 87, 89 may undergo development and formation at different rates and at different times. For instance, the first weld joint 87 may develop and be formed initially, followed by subsequent development and formation of the second weld joint 89; or, oppositely, the second weld joint 89 may develop and be formed initially, followed by subsequent development and formation of the first weld joint 87. In a currently preferred procedure, electrical current delivery is controlled to initially form the second weld joint 89. Once the second weld joint 89 is cooled and solidified, electrical current is restarted to subsequently form the first weld joint 87. Weld schedules suitable for development and formation of the first weld joint 87 include those described in U.S. patent application publication no. 2015/0053655 and U.S. patent application publication no. 2017/0106466, both of which are hereby incorporated by reference in their entirety. And in yet another alternative order and timing, the resistance spot welding method to join the steel plate 86, 186 to the steel workpiece 14 may occur after the resistance spot welding method to form the weld joint 80 between the steel and aluminum workpieces 14, 16. In this case, the first and second welding electrodes 20, 22 are respectively pressed against the aluminum workpiece surface 26 of the first side 24 of the joined steel and aluminum workpiece assemblage and the back surface 88, 188 of the steel plate 86, 186. This subsequent spot welding method may further grow the weld nugget previously produced between the steel and aluminum workpieces 14, 16 formed by the initial spot welding method.

The attachment between the steel plate 86, 186 and steel workpiece 14 may constitute the sole attachment therebetween, and the steel plate 86, 186 and steel workpiece 14 may lack attachment to each other elsewhere. In other words, the steel plate 86, 186 is not merely an additionally-layered steel workpiece added to the workpiece stack-up 12, as this would simply add unnecessary cost and complexity to the workpiece stack-up 12. Rather, the steel plate 86, 186 is a localized appendage intended to augment the strength of the steel workpiece 14 at the weld joint 80. The steel plate 86, 186 may be absent from other areas of the steel workpiece 14 displaced from the weld joint 80.

The thickness 800 and the strength of the steel plate 86, 186 are determined and selected based on imparting a desired degree of thickening and stiffening at the weld joint 80 in order to effectively preclude fracture of the intermetallic layer(s) 84. The precise thickness 800 can vary among different embodiments and is influenced by one or more of the following factors: the thickness 200 of the steel workpiece 14, the yield strength of the steel workpiece 14, the thickness 300 of the aluminum workpiece 16, the yield strength of the aluminum workpiece 16, and the attachment technique employed between the steel plate 86, 186 and steel workpiece 14. In embodiments in which the steel plate 86, 186 is resistance spot welded to the steel workpiece 14, the thickness 800 of the steel plate 86, 186 can be equal to or greater than the thickness 300 of the aluminum workpiece 16; similarly, the yield strength of the steel plate 86, 186 can be equal to or greater than the yield strength of the aluminum workpiece 16. Satisfying one or both of these relationships is thought to effectively preclude fracture of the intermetallic layer(s) 84. In embodiments in which the attachment between the steel plate 86, 186 and the steel workpiece 14 involves adhesive bonding (i.e., solely adhesively-bonded or weld-bonded), the thickness 800 of the steel plate 86, 186 can be such that the total thickness dimension of the steel workpiece 14 and steel plate 86, 186 added together (i.e., thickness 200 added with thickness 800) is equal to or greater than the thickness 300 of the aluminum workpiece 16; similarly, the yield strength of the steel plate 86, 186 can be equal to or greater than the yield strength of the aluminum workpiece 16. Satisfying one or both of these relationships is thought to effectively preclude fracture of the intermetallic layer(s) 84. Furthermore, in automotive applications, when making these determinations and selections, skilled artisans should appreciate that certain aluminum and steel materials are affected when subjected to low temperature baking—such as ELPO baking procedures—and hence that yield strengths should be assessed in these as-baked conditions.

Figure 11:
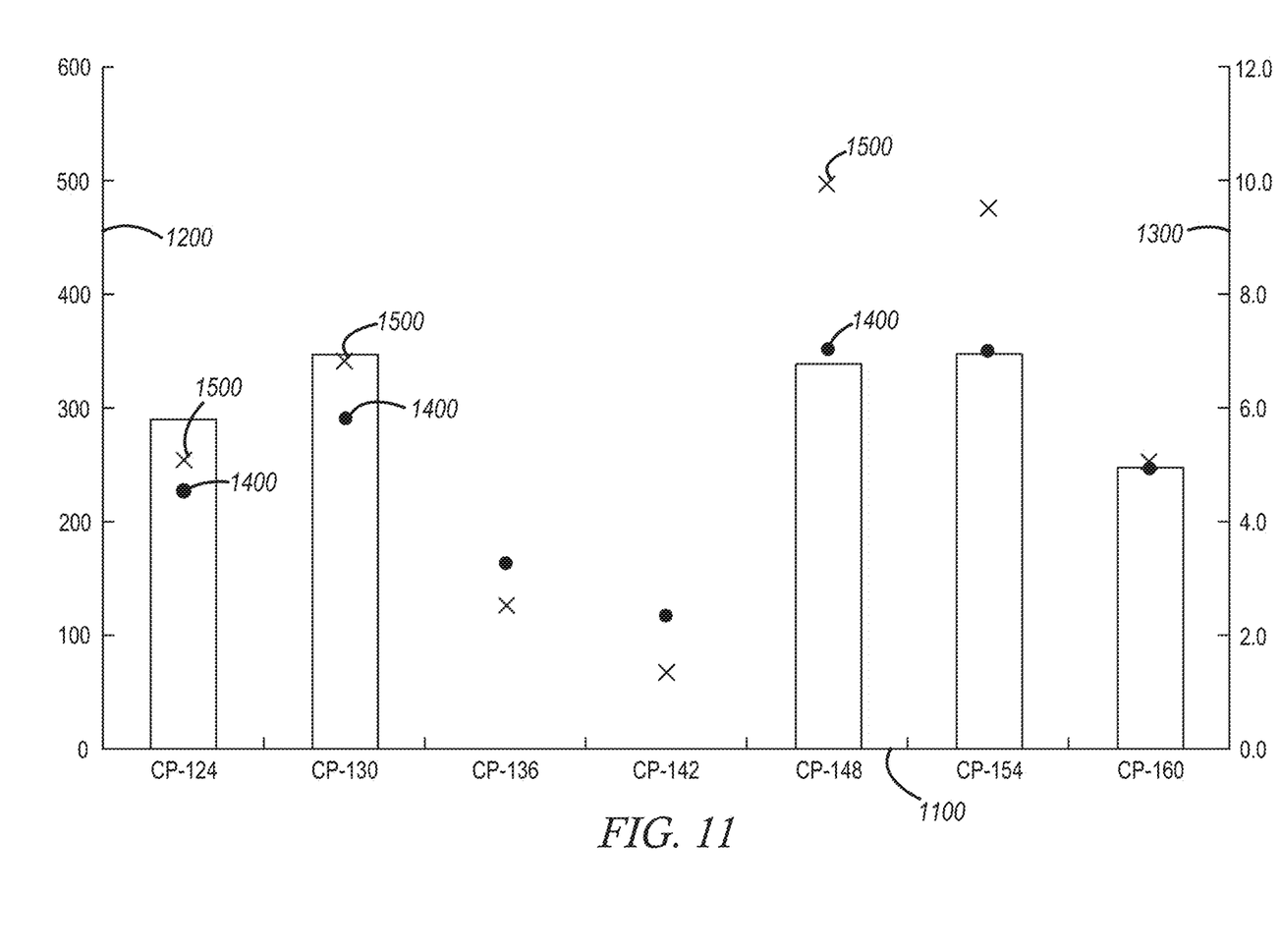
FIG. 11 is a bar graph of various coach peel samples lacking a steel plate, with peak peel strength in newtons (N) denoted on the leftside Y-axis, and total energy in joules (J) denoted on the rightside Y-axis, as well as with weld button size or diameter in millimeters (mm) denoted on the rightside Y-axis.
Figure 12:
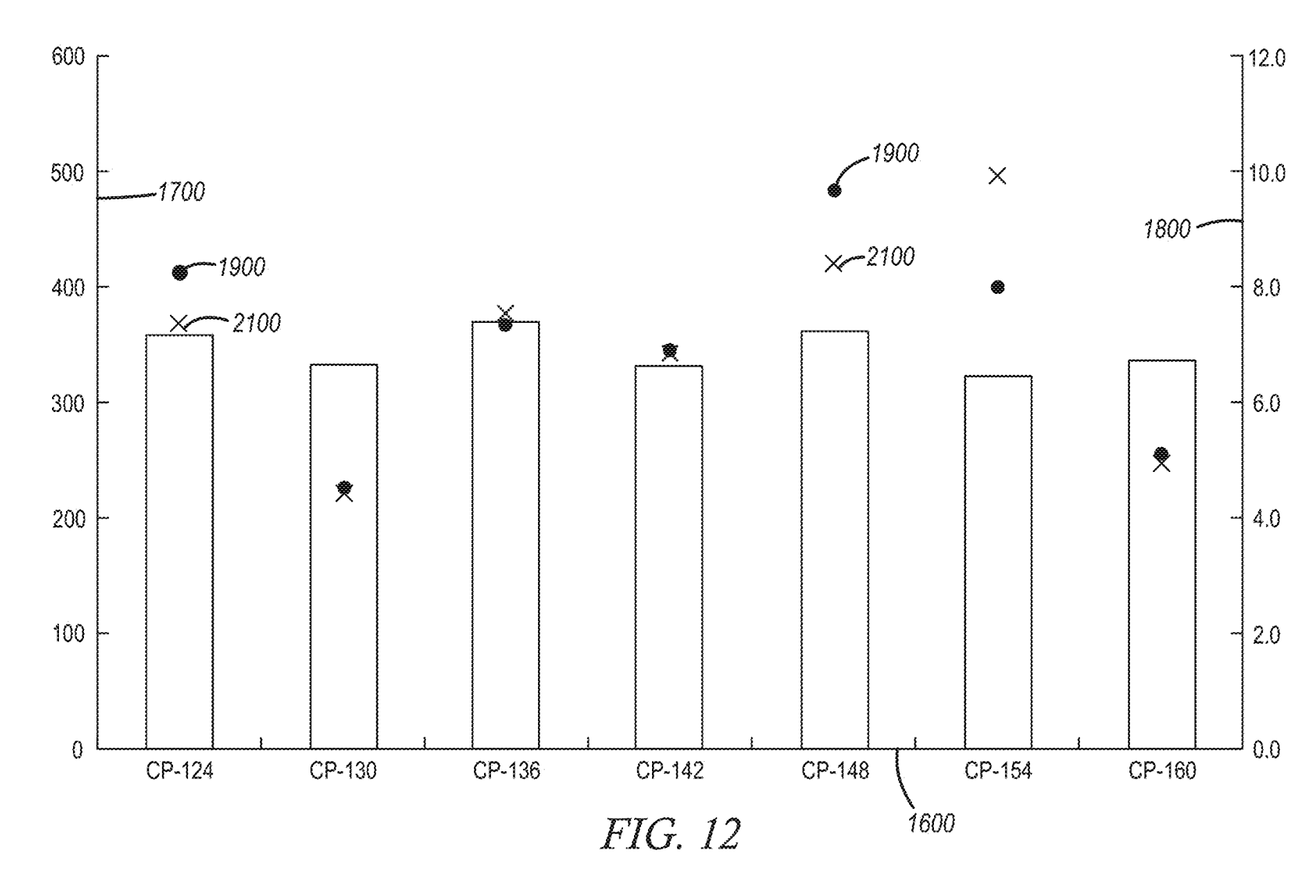
FIG. 12 is a bar graph of various coach peel samples having a steel plate, with peak peel strength in newtons (N) denoted on the leftside Y-axis and total energy in joules (J) denoted on the rightside Y-axis, as well as with weld button size or diameter in millimeters (mm) denoted on the rightside Y-axis.

The bar graphs of FIGS. 11 and 12 demonstrate the effectiveness of appending a steel plate to the steel-side of a workpiece stack-up, as described. The bar graph of FIG. 11 presents various coach peel samples (CP-124, CP-130, CP-136, CP-142, CP-148, CP-154, and CP-160 denoted along the X-axis 1100) that lack an appended steel plate and, rather, have only the steel workpiece 14 and the aluminum workpiece 16. In FIG. 11, peak or maximum peel strength in newtons (N) is denoted on the leftside Y-axis 1200 and total energy in joules (J) is denoted on the rightside Y-axis 1300; also denoted on the rightside Y-axis 1300 is weld button size or diameter in millimeters (mm). The steel workpiece 14 subjected to testing was a low-carbon steel having a thickness of 0.6 mm, and the aluminum workpiece 16 subjected to testing was a 6XXX series aluminum alloy X626 having a thickness of 0.8 mm. The circle marks (●) 1400 denote peak load (N), the X marks 1500 denote energy to break (J), and the height of the vertical bars denotes the weld button size or diameter. The bar graph of FIG. 12 presents various coach peel samples (CP-124, CP-130, CP-136, CP-142, CP-148, CP-154, and CP-160 denoted along the X-axis 1600) that have a steel plate attached thereto by way of adhesive bonding. In FIG. 12, peak or maximum peel strength in newtons (N) is denoted on the leftside Y-axis 1700 and total energy in joules (J) is denoted on the rightside Y-axis 1800; also denoted on the rightside Y-axis 1800 is weld button size or diameter in millimeters (mm). The steel workpiece 14 subjected to testing was a low-carbon steel having a thickness of 0.6 mm, the steel plate 86, 186 subjected to testing was also a low-carbon steel having a thickness of 0.6 mm, and the aluminum workpiece 16 subjected to testing was a 6XXX aluminum alloy X626 having a thickness of 0.8 mm. The circle marks (●) 1900 denote peak load (N), the X marks 2100 denote energy to break (J), and the height of the vertical bars denotes the weld button size or diameter. A comparison of the bar graphs of FIGS. 11 and 12 reveals a considerable improvement in maximum peel strength, energy absorption, and weld button size by the appendage of the steel plate.

Figure 9:
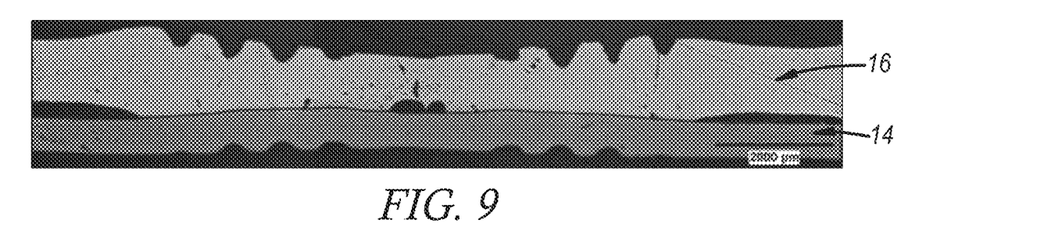
FIG. 9 is a microstructure of a weld nugget of a workpiece stack-up that lacks a steel plate.
Figure 10:
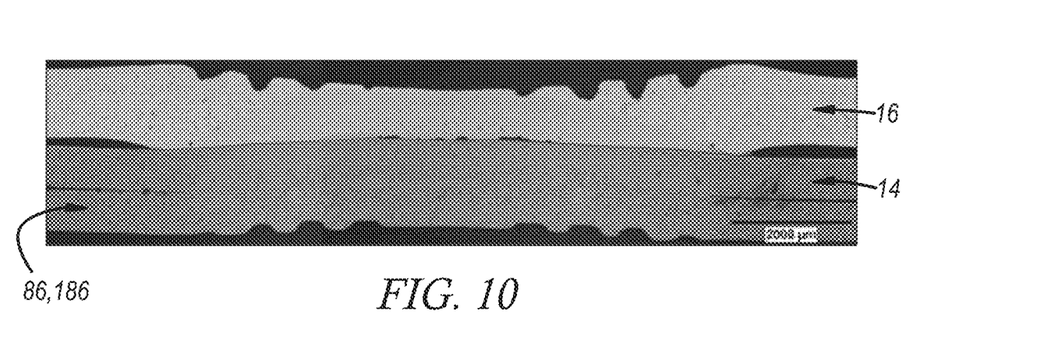
FIG. 10 is a microstructure of a weld nugget of a workpiece stack-up with a steel plate.

Referring now to FIG. 9, an example microstructure is shown of a workpiece stack-up having only the steel workpiece 14 and the aluminum workpiece 16, and lacking an appended steel plate like those described above. The steel workpiece 14 was a low carbon steel sheet with a thickness of 0.7 mm, and the aluminum workpiece 16 was an AA6022-T4 aluminum alloy with a thickness of 1.2 mm. The weld joint of this microstructure yielded a coach peel strength of 95 N. In FIG. 10, on the other hand, an example microstructure is shown of a workpiece stack-up having the steel workpiece 14 and the aluminum workpiece 16, as well as having the steel plate 86, 186. As before, the steel workpiece 14 was a low carbon steel sheet with a thickness of 0.7 mm, and the aluminum workpiece 16 was an AA6022-T4 aluminum alloy with a thickness of 1.2 mm. The steel plate 86, 186 was a low carbon steel sheet with a thickness of 0.7 mm. The steel plate 86, 186 was welded to the steel workpiece 14 concurrently with the resistance spot welding method carried out to form the weld joint between the steel and aluminum workpieces 14, 16. The weld joint of this microstructure yielded a coach peel strength of 350 N, a significant advancement in mechanical performance compared to the workpiece stack-up of FIG. 9 that lacked an appended steel plate.

Furthermore, whether the steel plate 86, 186 is suitable and indeed advantageous for a particular workpiece stack-up may be dependent upon different factors including, in an embodiment, mechanical loading exerted on the weld joint formed between the steel and aluminum workpieces 14, 16. One way found to determine the suitability of the steel plate 86, 186 in a particular workpiece stack-up is to perform a test in which coupons or a portion of a welded part are subjected to peeling by clamping the steel workpiece 14 in place and then peeling off the aluminum workpiece 16. The steel plate 86, 186 is determined suitable and advantageous for utilization if one of the following is observed: i) the weld joint fractures along the interface of the steel and aluminum workpieces 14, 16, or ii) a weld button of desired size does not remain (e.g., in an example, the desired size of the weld button is ascertained by multiplying the square root ($\sqrt{\;}$) of the thickness 300 of the aluminum workpiece 16 by the numeral five (5)). Other ways found to determine the suitability of the steel plate 86, 186 in a particular workpiece stack-up include the coach peel testing that yielded the graphs of FIGS. 11 and 12, as well as cross-tension testing in which a tensile load is applied to the weld joint in a direction that is normal to the weld joint. As before, the steel plate 86, 186 is determined suitable and advantageous for utilization if one of the following is observed: i) the weld joint fractures along the interface of the steel and aluminum workpieces 14, 16, or ii) a weld button of desired size does not remain (e.g., in an example, the desired size of the weld button is ascertained by multiplying the square root ($\sqrt{\ }$) of the thickness 300 of the aluminum workpiece 16 by the numeral five (5)).

The above description of preferred exemplary embodiments and specific examples are merely descriptive in nature; they are not intended to limit the scope of the claims that follow. Each of the terms used in the appended claims should be given its ordinary and customary meaning unless specifically and unambiguously stated otherwise in the specification.

What is claimed is:

1. A method of resistance spot welding a workpiece stack-up that comprises a steel workpiece and an aluminum workpiece, the method comprising:
    attaching a steel plate to the steel workpiece so that the steel plate is disposed over a weld-site of the workpiece stack-up;
    clamping a first welding electrode and a second welding electrode on the workpiece stack-up at the weld-site;
    passing electrical current between the first and second welding electrodes at the weld-site to create a molten aluminum weld pool within the aluminum workpiece that wets a faying surface of the steel workpiece; and
    terminating passage of electrical current between the first and second welding electrodes to allow the molten aluminum weld pool to solidify into a weld joint;
    wherein the steel plate stiffens the weld joint that bonds the steel and aluminum workpieces together,
    wherein the weld joint comprises a weld nugget and a central point of the weld nugget to a cross-wise extent that is at least 40% greater than a cross-wise extent measured from the central point of the weld nugget to an edge thereof.

2. The method set forth in claim 1, wherein attaching the steel plate to the steel workpiece involves applying adhesive between the steel plate and the steel workpiece.

3. The method set forth in claim 1, wherein attaching the steel plate to the steel workpiece involves resistance spot welding the steel plate to the steel workpiece.

4. The method set forth in claim 1, wherein attaching the steel plate to the steel workpiece involves applying adhesive between the steel plate and the steel workpiece, subsequently performing the step of clamping the first and second welding electrodes on the workpiece stack-up and the steel plate at the weld-site, and then subsequently performing the step of passing electrical current between the first and second welding electrodes at the weld-site, wherein the electrical current passes through the applied adhesive between the steel plate and the steel workpiece.

5. The method set forth in claim 4, further comprising curing the adhesive applied between the steel plate and the steel workpiece subsequent to the step of passing electrical current between the first and second welding electrodes at the weld-site.

6. The method set forth in claim 1, wherein attaching the steel plate to the steel workpiece involves applying adhesive between the steel plate and the steel workpiece subsequent to the step of clamping the first and second welding electrodes on the workpiece stack-up at the weld-site and subsequent to the step of passing electrical current between the first and second welding electrodes at the weld-site.

7. The method set forth in claim 6, further comprising curing the adhesive applied between the steel plate and the steel workpiece.

8. The method set forth in claim 6, further comprising clamping the first and second welding electrodes on the workpiece stack-up and the steel plate with the adhesive applied between the steel plate and the steel workpiece, and passing electrical current between the first and second welding electrodes at the weld-site, wherein the electrical current passes through the applied adhesive between the steel plate and the steel workpiece.

9. The method set forth in claim 8, further comprising curing the adhesive applied between the steel plate and the steel workpiece subsequent to the electrical current being passed through the applied adhesive between the steel plate and the steel workpiece.

10. The method set forth in claim 1, wherein attaching the steel plate to the steel workpiece involves resistance spot welding the steel plate to the steel workpiece subsequent to the step of clamping the first and second welding electrodes on the workpiece stack-up at the weld-site and subsequent to the step of passing electrical current between the first and second welding electrodes at the weld-site.

11. The method set forth in claim 10, further comprising clamping the first and second welding electrodes on the workpiece stack-up and the steel plate at the weld-site, and passing electrical current between the first and second welding electrodes at the weld-site in order to form a weld joint between the steel plate and the steel workpiece.

12. The method set forth in claim 1, further comprising locating the steel plate adjacent a surface of the steel workpiece at the weld-site prior to the step of clamping the first and second welding electrodes, and subsequently performing the step of clamping the first and second welding electrodes on the workpiece stack-up and the steel plate at the weld-site, and then subsequently performing the step of passing electrical current between the first and second welding electrodes at the weld-site.

13. The method set forth in claim 12, wherein a first weld joint between the steel workpiece and the aluminum workpiece is formed concurrently with the formation of a second weld joint formed between the steel plate and the steel workpiece.

14. The method set forth in claim 12, wherein a first weld joint between the steel workpiece and the aluminum workpiece is formed prior to the formation of a second weld joint formed between the steel plate and the steel workpiece.

15. The method set forth in claim 12, wherein a first weld joint between the steel workpiece and the aluminum workpiece is formed subsequent to the formation of a second weld joint formed between the steel plate and the steel workpiece.

16. The method set forth in claim 1, wherein attaching the steel plate to the steel workpiece involves resistance spot welding the steel plate to the steel workpiece prior to the step of clamping the first and second welding electrodes, and prior to the step of passing electrical current between the first and second welding electrodes.

17. The method set forth in claim 16, wherein the step of clamping the first and second welding electrodes includes clamping the first and second welding electrodes on the workpiece stack-up at the weld-site with the steel plate resistance spot welded to the steel workpiece.

18. The method set forth in claim 1, wherein the steel plate is a unitary extension of the steel workpiece and the steel plate resides at a peripheral edge of the steel workpiece.

19. The method set forth in claim 1, wherein the steel plate is a unitary extension of the steel workpiece and the steel plate resides at an interior site of the steel workpiece and inboard of a peripheral edge of the steel workpiece.

20. A method of resistance spot welding a workpiece stack-up that comprises a steel workpiece and an aluminum workpiece, the method comprising:
   attaching a steel plate to the steel workpiece so that the steel plate is disposed over a weld-site of the workpiece stack-up;
   passing electrical current between a first welding electrode and a second welding electrode at the weld-site to create a molten aluminum weld pool within the aluminum workpiece that wets a faying surface of the steel workpiece; and
   terminating passage of electrical current between the first and second welding electrodes to allow the molten aluminum weld pool to solidify into a weld joint;
   wherein the steel plate has an attachment to the steel workpiece solely at the weld-site and lacks attachment to the steel workpiece elsewhere,
   wherein the weld joint comprises a weld nugget and a central point of the weld nugget to a cross-wise extent that is at least 40% greater than a cross-wise extent measured from the central point of the weld nugget to an edge thereof.

* * * * *